United States Patent
Mills

(10) Patent No.: US 7,016,842 B2
(45) Date of Patent: Mar. 21, 2006

(54) METHOD AND SYSTEM FOR EVALUATING AUTOMATIC SPEECH RECOGNITION TELEPHONE SERVICES

(75) Inventor: Scott H. Mills, Austin, TX (US)

(73) Assignee: SBC Technology Resources, Inc., Austin, TX (US)

(*) Notice: Subject to any disclaimer, the term of this patent is extended or adjusted under 35 U.S.C. 154(b) by 876 days.

(21) Appl. No.: 10/106,074

(22) Filed: Mar. 26, 2002

(65) Prior Publication Data

US 2003/0187639 A1    Oct. 2, 2003

(51) Int. Cl.
*G10L 15/00*     (2006.01)
*H04M 1/24*      (2006.01)

(52) U.S. Cl. .................................. 704/270; 379/27.04

(58) Field of Classification Search ................ None

See application file for complete search history.

(56) References Cited

U.S. PATENT DOCUMENTS

| | | | | |
|---|---|---|---|---|
| 5,638,431 A | * | 6/1997 | Everett et al. | 379/114.28 |
| 5,640,446 A | * | 6/1997 | Everett et al. | 379/114.28 |
| 5,715,369 A | | 2/1998 | Spoltman | 395/2.79 |
| 5,737,489 A | | 4/1998 | Chou et al. | 395/2.65 |
| 5,832,565 A | * | 11/1998 | Smith et al. | 379/27.04 |
| 6,091,802 A | * | 7/2000 | Smith et al. | 379/10.03 |
| 6,299,452 B1 | | 10/2001 | Wasowicz et al. | 434/178 |

* cited by examiner

*Primary Examiner*—David D. Knepper
(74) *Attorney, Agent, or Firm*—Baker Botts L.L.P.

(57) ABSTRACT

A method and system for evaluating telephone services provided by speech recognition interfaces an evaluation engine with a voice recognition service over a telephone system to submit speech utterance samples to the voice recognition service, receive the response of the voice recognition service to the sample utterances, and determine error and recognition of the sample utterances by the voice recognition service by comparing actual voice recognition service responses to expected responses. The evaluation engine permits evaluation of a voice recognition service for plural glossaries in different contexts, such as through predetermined nodes of a voice recognition service menu having plural glossaries.

20 Claims, 1 Drawing Sheet

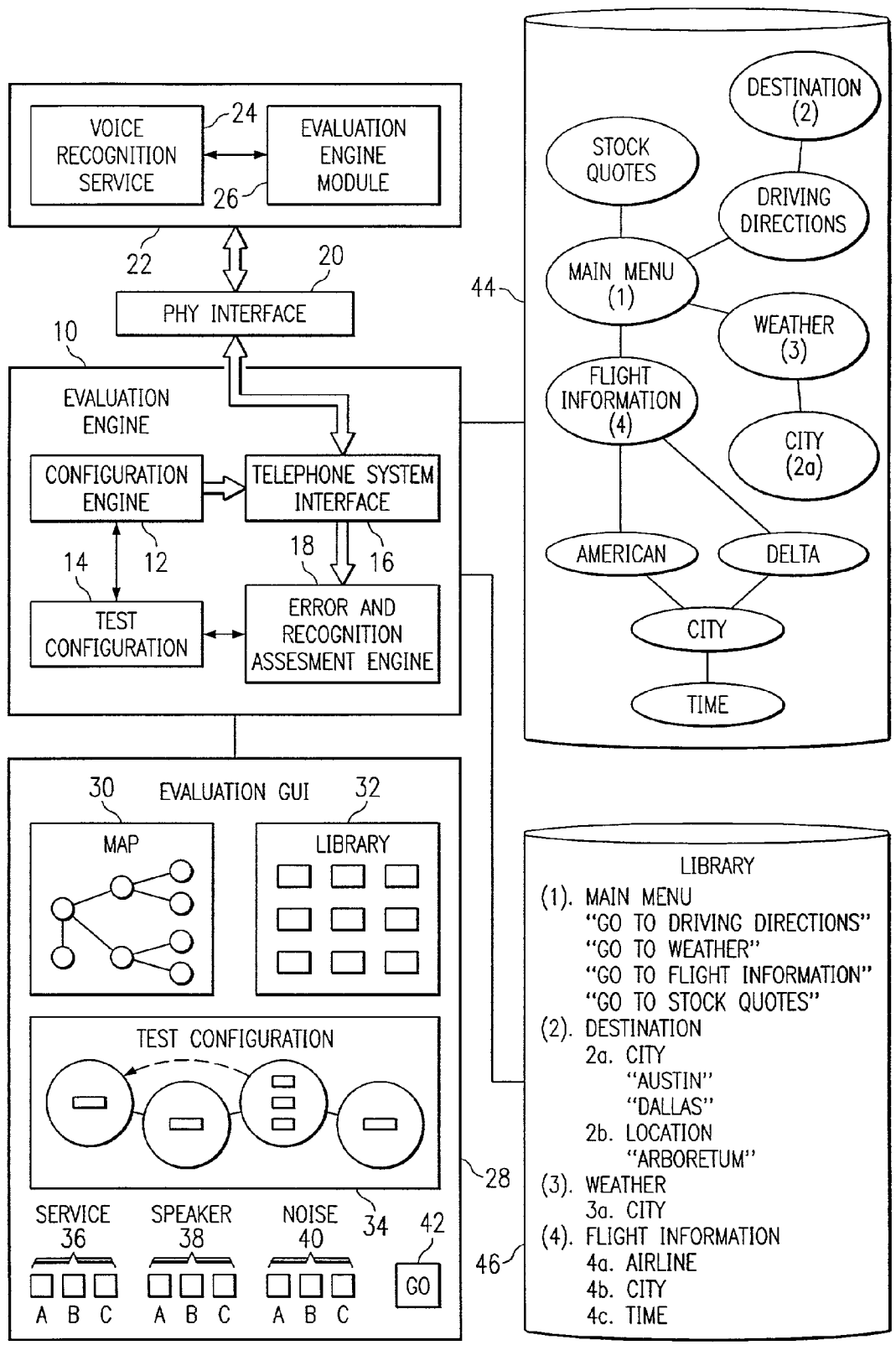

METHOD AND SYSTEM FOR EVALUATING AUTOMATIC SPEECH RECOGNITION TELEPHONE SERVICES

TECHNICAL FIELD OF THE INVENTION

The present invention relates generally to the evaluation of automated speech recognition, and more specifically relates to the evaluation of the effectiveness of automated speech recognition in providing a telephone service.

BACKGROUND OF THE INVENTION

Automatic speech recognition (ASR) technology interacts with human users by recognizing speech commands and responding with some action, such as providing users with information. ASR uses processor intensive evaluation of digitized voice signals to recognize human speech. For instance, ASR compares a digitized voice signal against a glossary, also known as a vocabulary, of expected responses and identifies the digitized voice signal as an expected response if a match is found with a great enough confidence. In order to improve the reliability of an ASR system, glossaries of expected responses are typically fine tuned to adapt as much as possible to variations in human voices and noise signals for a likely set of commands. ASR technology has steadily improved in terms of reliability and speed as processing capability and processing techniques have improved so that ASR technology is growing increasingly popular as a user friendly interface for businesses.

One application for ASR technology that is gaining wide acceptance is the use of voice recognition for providing services through a telephone network. Voice recognition offers a friendly alternative to touch tone services provided through DTMF signals and also reduces the cost otherwise associated with live operator support of customer inquiries. In particular, voice recognition based telephone services have grown increasingly popular in providing services through mobile devices such as wireless or cell phone networks because users are able to access information "hands off" making cell phone use safer, such as in driving conditions. As the quality of voice recognition applications has improved, an increasing number of services have become available ranging from obtaining driving directions, weather information, flight information and reservations and even stock quotes. For instance, Cingular wireless offers a variety of services supported by voice recognition through Cingular's VOICE CONNECT service.

When it works, voice recognition technology offers clear advantages for inputting requests to a telephone system compared with touch pad DTMF signaling and offers considerable cost advantages over the use of live operators. However, when voice recognition fails or performs unreliably, voice recognition introduces considerable user frustration. Thus, to improve reliability, voice recognition applications are typically tuned for a given set of expected commands and conditions. For instance, within a given service, separate glossaries of responses are often used to improve reliability by increasing the likelihood that a voice request will be recognized, with each glossary designed to address a set of commands. Further, glossaries are fine tuned periodically to adapt to changing conditions and respond to reliability problems. These fine tunings are in addition to changes implemented for menu items and additional services.

One significant difficulty with updating and improving the reliability of services supported by voice recognition is that changes and updates to voice recognition glossaries to support menu changes will have an effect on the service as a whole, for instance by altering recognition rates where glossaries are applied in different contexts. When voice recognition is deployed to a telephone service the overall impact of fine tuning of a glossary is difficult to predict for the application of the glossary in different contexts, such as in combination with other glossaries, especially when real live factors like noise and variations in voices are taken into account.

BRIEF DESCRIPTION OF THE DRAWINGS

A more complete understanding of the present embodiments and advantages thereof may be acquired by referring to the following description taken in conjunction with the accompanying drawing, in which like reference numbers indicate like features, and wherein:

The FIGURE depicts a block diagram of a system for evaluating automatic speech recognition services provided through a telephone network.

DETAILED DESCRIPTION OF THE INVENTION

Preferred embodiments of the present invention are illustrated in the figures, like numerals being used to refer to like and corresponding parts of the various drawings.

Voice recognition glossaries are typically designed and applied to optimize recognition of a set of expected commands, such as names of cities. However, in a voice recognition service having a variety of menu nodes, a number of different glossaries are typically used with each menu node. Thus, at any given node, a context having a wide variety of combinations of expected commands is possible so that voice utterances intended for recognition by one glossary may have an impact on recognition by other glossaries associated with a menu node. In other words, an accurate measure of the usability of a service that uses voice recognition is difficult to obtain from abstract testing of individual nodes or glossaries.

In order to evaluate voice recognition services using different combinations of one or more glossaries, the present invention uses sample utterances in different contexts to determine error and recognition rates. For instance, a sample utterance evaluates recognition of a voice command at different menu nodes of a voice recognition service so that evaluation of the response to the command is within a context of glossaries applied at that node.

Referring now to the FIGURE, a block diagram depicts a system for evaluating automatic speech recognition services provided by a telephone network. The system evaluates voice recognition services by interfacing with the service through the telephone network and submitting speech sample utterances and determining recognition and error rates for the voice recognition service. The evaluation is performed in either a manual or an automated mode by comparing expected responses to sample utterances against actual responses to identify errors and determine system reliability.

An evaluation engine 10 performs the evaluation of voice recognition services by sending selected sample utterances through the telephone network, receiving responses from the voice recognition service and determining error and recognition rates for the sample utterances. A configuration engine 12 interacts with a user to establish a test configuration 14 and to provide the sample utterances of test configuration 14 to the voice recognition service through a telephone system interface 16. Responses from the voice recognition service are received at telephone system interface 16 and are provided to an error and recognition assessment engine 18. Error and recognition assessment engine 18 compares received results against expected results from the sample utterance sent according to test configuration 14. Error and recognition rates are determinable either through user interaction of comparing recorded sample utterances and recorded voice recognition service responses or by automated comparisons that track sample utterances and voice recognition service responses by error and recognition occurrences.

Telephone system interface 16 communicates with telephone network 22 through a physical interface 20, such as a hybrid coupler phone tap. For instance, evaluation engine 10 resides on a personal computer having a phone tap physical interface 20 that allows evaluation engine 10 to directly dial through network 22 to communicate with a voice recognition service 24. Direct communication between evaluation engine 10 and voice recognition service 24 allows emulation of voice commands so that evaluation engine 10 is able to navigate through a voice recognition service menu either by following a test configuration 14 or by manual manipulation through a user interface. Thus, for instance, if a problem is noted with a voice recognition service, a technician may manually navigate through the nodes of the menu with a variety of sample utterances to evaluate the extent of the difficulty or may design a test configuration that provides an automated navigation of the menu and reports error and recognition rates.

In one embodiment, in addition to the voice emulation interaction with voice recognition service 24, an evaluation engine module 26 associated with voice recognition service 24 establishes a logical link with telephone system interface 16 to allow coordination with test configuration 14. For instance, evaluation engine module 26 brings voice recognition service 24 to a menu node corresponding to a menu node identified in configuration engine 14 so that sample utterances are submitted for evaluation without having to follow the menu tree between nodes of the voice recognition service. Thus, as an example, telephone system interface 16 may send sample utterances associated with one or more predetermined menu nodes in a repeated manner not bound by the menu of the voice recognition service with evaluation engine module 26 bringing voice recognition service 24 to the predetermined node before each sample utterance is sent.

An evaluation graphical user interface 28 allows user interaction with evaluation engine 10 to establish and run test configurations 14. Evaluation graphical user interface 28 is, for example, created with Visual Basic to operate on a Windows based personal computer, although other embodiments may use alternative programming applications and operating systems. Evaluation graphical user interface 28 applies a map 30 of voice recognition service 24 and a library 32 of sample utterances, such as digitized voice samples stored as wave files having a ".wav" extension, to design a test configuration 14 in a test configuration window 34. Service buttons 36 allow the design of a test configuration 14 for a selected voice recognition service 24 and allows establishment of basic contact information, such as the telephone number to dial for the voice recognition service 24 that is selected. Speaker buttons 38 allow the selection of sample utterances classified by the speaker that generated the utterances. Noise buttons 40 allow a test configuration 14 to include simulated levels of noise such as static, road noise and/or crowd noise. A go button 42 initiates testing.

Map window 30 and library window 32 access configuration engine 12 to allow selection of a test configuration 14 through test configuration engine 34. Configuration engine 12 presents a voice recognition service menu on map window 30 and a library of stored digital sample utterances in library 32 from a voice recognition service menu data base 44 and sample utterance library data base 46. Menu data base 44 includes a series of nodes corresponding to the menu items of voice recognition service 24.

For instance, when a caller calls voice recognition service 24 the call is initially handled at a main menu node which provides generalized areas of inquiry that allow the user to select more specific information from children nodes of the main menu node. As an example, main menu node of menu data base 44 provides a user with options to select children nodes including driving directions, weather, flight information, or stock quotes. The user selects an appropriate child node from the main menu by saying "go to driving directions", "go to weather", "go to flight information", or "go to stock quotes", as depicted by the utterances of library data base 46.

The selections available from the main menu node are often global selections that a user may state from any child node to proceed automatically to a selected child node or the parent main menu node. For instance, a user who selects flight information may automatically proceed to weather information from the flight information child node by stating the utterance of the main menu node "go to weather". The child nodes of the main menu node in turn have child nodes that aid callers in determining specific information. For instance, the flight information child node allows a user to select an airline, destination and arrival city, as well as destination and arrival times. The weather child node allows a user to select a city. The driving directions child node allows a user to select a location, possibly a city or a landmark within a city. The stock quotes child node allows a user to select a company such as Southwestern Bell Corporation by either the company's name or ticker symbol, SBC.

The voice recognition service 24 applies one or more glossaries at each node of menu data base 44 to identify appropriate information for a caller. For instance, each node is tuned for voice recognition of expected requests of a caller to improve efficiency and reliability of the voice recognition service. One difficulty with the use of different glossaries is that one or more utterances may overlap between different nodes of the menu leading to reduced service reliability. For instance, a node that relates to stock quotes may fail to recognize global glossary utterances due to the relationship between the utterances for stock quotes available through the service and the utterances associated with a global menu node, such as the main menu node. In such a situation, a caller at the stock quotes node who commands "go to main menu" instead could receive an unrequested stock quote, resulting in caller frustration and an inability to proceed to the main menu.

Test configuration window 34 provides a drop and drag environment for creating a test configuration 14 by selecting nodes from map window 30 and sample utterances for the node from library window 32. In the most simple example, a user contacts voice recognition service 24 through telephone system interface 16 and manually selecting sample utterances from library window 32 based on a speaker selected from button 38. For instance, once telephone system interface 16 establishes contact with voice recognition service 24 a user selects "go to driving directions" from library window 32 stated by a speaker selected by button 38. In this manner, the user may navigate the menu of voice recognition service 24 as a normal caller but with sample utterances and simulated noise conditions. The error or recognition results of the response are tracked by error and recognition engine 18 which provides an automated comparison to expected voice recognition service responses, records responses for future comparison or tabulates error or recognition results based upon a manual determination made by the user.

In an alternative embodiment, test configuration window 34 automates a test configuration 14 for evaluation engine 10 to run in cooperation with voice recognition service 24. For example, the test configuration depicted in window 34 of the FIGURE illustrates navigation through four voice recognition service nodes with selected sample utterances at each node. Evaluation engine 10 automates interaction with voice recognition service 24 according to test configuration 14 as designed in test configuration window 34 so that, for instance, a desired test configuration may be repeatedly run with different speaker and noise conditions. Error and recognition assessment engine 18 tracks responses to voice recognition service 24 and tabulates results based on a comparison of actual and expected responses by voice recognition service 24 to sample utterances. Evaluation engine module 26 automates the navigation of voice recognition service 24 to enable a more rapid navigation through nodes to be tested by avoiding the need to navigate by voice commands.

One advantage of evaluation engine 10 is that test configurations 14 allows the testing of speech recognition and error rates based on context. For example, the error and recognition rates associated with a particular glossary or glossaries are tested within the context of the voice recognition service. As glossaries are updated and tuned for a node or nodes of a voice recognition menu, the impact of such updates or tuning is tested so that the response of a voice recognition service in different contexts is determined. For instance, the addition of a new stock for stock quotes to a voice recognition service glossary may have unintended impacts on a global glossary such as the main menu so that a caller at the stock quotes node who states "go to main menu" has a greater likelihood of voice recognition error in the stock quote context than in the main menu context. Indeed, as voice recognition service menus grow more complicated, it becomes more difficult to design glossaries for a particular context so that the glossaries take into account the myriad of other menu items that may be available to callers of a voice recognition service in the context of that node.

One example of an advantage of evaluation engine 10 is that it provides a practical testing tool that identifies potential problems with a voice recognition service in the actual context of the service as opposed to separate testing of the glossaries. Thus, as services are updated to include additional nodes, changes to nodes or fine-tuning of glossaries, test configurations run by evaluation engine 10 allow a determination of the effect of changes in the actual context of the voice recognition service. By identifying potential recognition errors in the context of the voice recognition service, evaluation engine 10 provides a basis for improving node and glossary design for a voice recognition service as a whole.

Another example of an advantage of evaluation engine 10 is that it provides a user-friendly testing platform to evaluate the effectiveness of a voice recognition service provided through a telephone network. For instance, complaints by telephone network users about particular menu node or voice command failures may be tested through a simulated interaction that emulates the conditions of the reported failure. Automated test configurations with sample utterances from a range of speakers and conditions allows the pinpointing of problem areas to provide specific areas for improvement, thus reducing the cost and improving the results of future updates.

Another example of an advantage is that evaluation engine 10 is flexible to adapt to a variety of services, including services provided by different vendors. For instance, because evaluation engine 10 interfaces with services through a telephone network, it provides a base testing platform for comparing services provided by different vendors by initiating interaction with each service as a customer.

Although the present invention has been described in detail, it should be understood that various changes, substitutions and alterations can be made hereto without the parting from the spirit and scope of the invention as defined by the appended claims.

What is claimed is:

1. A method for evaluating telephone services provided by speech recognition, the method comprising:
   interfacing over a telephone network with a speech recognition service, the speech recognition service having plural nodes and plural glossaries, each glossary applicable to one or more nodes of the service;
   submitting speech utterance samples to the speech recognition service, the speech utterance samples associated with a node having plural glossaries; and
   determining the response of the speech recognition service to each speech utterance sample.

2. The method of claim 1 wherein at least one glossary is a global glossary applicable to all nodes of the speech recognition service, submitting speech utterance samples further comprising submitting one or more speech utterance samples associated with the global directory to plural nodes of the speech recognition service.

3. The method of claim 2 wherein the utterance sample comprises a command to go to a main menu node.

4. The method of claim 1 further comprising:
   defining a test configuration for the telephone service, the test configuration having plural utterance samples for submission to one or more nodes of the telephone service.

5. The method of claim 4 wherein the test configuration navigates the telephone service menu to evaluate recognition of the utterance samples.

6. The method of claim 4 further comprising:
   providing the test configuration to the telephone service; and
   navigating the telephone service by coordinating submission of the utterance samples to predetermined telephone service nodes according to the test configuration.

7. The method of claim 4 further comprising:
   introducing simulated noise to one or more utterance samples.

8. The method of claim 7 wherein the simulated noise comprises simulated road noise.

9. The method of claim 7 wherein the simulated noise comprises simulated static noise.

10. The method of claim 7 wherein the simulated noise comprises simulated crowd noise.

11. A system for evaluating a telephone service provided by speech recognition, the service having plural nodes, each node having one or more glossaries, the system comprising:
- a library of sample speech utterances;
- a map of one or more of the telephone service nodes;
- a telephone system interface operable to communicate with the service through a telephone network; and
- an evaluation engine interfaced with the library, the map, and the telephone interface, the evaluation engine operable to submit speech utterance samples to the service at one or more nodes and to determine the response of the service.

12. The system of claim 11 further comprising:
- a configuration engine associated with the evaluation engine; and
- a user interface in communication with the configuration engine, the user interface providing selections of utterance samples for one or more nodes of the telephone service.

13. The system of claim 12 wherein the configuration engine defines a test configuration to navigate one or more nodes of the telephone service with one or more utterance samples.

14. The system of claim 13 further comprising an evaluation engine module associated with the telephone service, the telephone system interface operable to provide the evaluation engine module with the test configuration, the evaluation engine module coordinating the navigation of utterance samples through one or more telephone service nodes.

15. The system of claim 11 wherein the telephone system interface comprises an analog telephone line.

16. The system of claim 11 wherein the utterance sample comprises a command associated with a global glossary.

17. A method for evaluating a voice recognition telephone service, the method comprising:
- establishing communication with the voice recognition service through a telephone network;
- submitting a first sample utterance associated with a first sample speaker to plural predetermined nodes of the telephone service; and
- comparing the response of the telephone service for each predetermined node with an expected response to determine recognition error rates.

18. The method of claim 17 wherein one or more of the predetermined nodes has plural voice recognition glossaries.

19. The method of claim 17 wherein submitting a first sample utterance further comprises automatically submitting the sample utterance to the plural nodes according to a test configuration.

20. The method of claim 19 further comprising:
- synchronizing the sample utterances with predetermined nodes of the voice recognition service menu by coordinating the menu nodes with the test configuration.

* * * * *